(12) United States Patent
Piao

(10) Patent No.: US 10,252,849 B2
(45) Date of Patent: Apr. 9, 2019

(54) COMPRESSED-TYPE INSTANCE NOODLE PACKAGING BOX AND METHOD OF MANUFACTURING THE SAME

(71) Applicant: Changjin Piao, Jiangsu (CN)

(72) Inventor: Changjin Piao, Jiangsu (CN)

(73) Assignee: Changjin Piao, Jiangsu (CN)

( * ) Notice: Subject to any disclaimer, the term of this patent is extended or adjusted under 35 U.S.C. 154(b) by 27 days.

(21) Appl. No.: 15/306,784

(22) PCT Filed: May 4, 2015

(86) PCT No.: PCT/CN2015/000307
§ 371 (c)(1),
(2) Date: Oct. 26, 2016

(87) PCT Pub. No.: WO2015/169102
PCT Pub. Date: Nov. 12, 2015

(65) Prior Publication Data
US 2017/0043928 A1    Feb. 16, 2017

(30) Foreign Application Priority Data

May 7, 2014  (CN) .......................... 2014 1 0191095

(51) Int. Cl.
*B65D 77/20*     (2006.01)
*B65D 77/02*     (2006.01)
(Continued)

(52) U.S. Cl.
CPC .............. *B65D 77/20* (2013.01); *A23L 7/113* (2016.08); *A23L 27/00* (2016.08); *B65B 1/02* (2013.01);
(Continued)

(58) Field of Classification Search
CPC ...... B65D 77/20; B65D 5/321; B65D 5/3657; B65D 5/40; B65D 5/68; B65D 21/086;
(Continued)

(56) References Cited

U.S. PATENT DOCUMENTS 4,212,232 A    7/1980 Lee

FOREIGN PATENT DOCUMENTS

CN    201002741 Y    1/2008
CN    201520476 U    7/2010
(Continued)

OTHER PUBLICATIONS

CN201520476 Translation Jul. 2010.*
(Continued)

*Primary Examiner* — Erik Kashnikow
*Assistant Examiner* — Chaim A Smith
(74) *Attorney, Agent, or Firm* — Rabin & Berdo, P.C.

(57) ABSTRACT

Disclosed are a compressed-type instant noodle packaging box and a method of manufacturing the same. The packaging box comprises a cuboid packaging box main body (1) of a volume slightly larger than that of the instant noddle block and a box cover (2) covering the packaging box main body, and further comprises a folding container of which a bottom face (4) is adhered together with a bottom face inside the packaging box main body, wherein after opening out in the packaging box main body, the folding container is a cuboid barrel body (14) higher than the packaging box main body; a separately packaged instant noodle bag, seasoning bag and cutlery bag are placed on an upper face of the folding container, and after the box cover covers the packaging box main body, the whole is provided on the outside thereof with a layer of heat-shrinkable film for sealing. The instant noodle packaging box has a small volume, occupies little space, and is convenient for transporting and carrying, the (Continued)

folding and opening methods for the folding container are simple, and the packaging box main body also plays the role of heat insulation.

4 Claims, 5 Drawing Sheets

(51) Int. Cl.
B65D 85/816 (2006.01)
A23L 27/00 (2016.01)
A23L 7/113 (2016.01)
B65B 5/02 (2006.01)
B65D 5/32 (2006.01)
B65D 75/00 (2006.01)
B65D 5/68 (2006.01)
B65D 21/08 (2006.01)
B65D 81/34 (2006.01)
B65D 5/36 (2006.01)
B65D 5/40 (2006.01)
B65B 25/00 (2006.01)
B65B 1/02 (2006.01)
B65B 7/28 (2006.01)
B65B 53/02 (2006.01)

(52) U.S. Cl.
CPC ............ *B65B 5/028* (2013.01); *B65B 25/001* (2013.01); *B65D 5/321* (2013.01); *B65D 5/3657* (2013.01); *B65D 5/40* (2013.01); *B65D 5/68* (2013.01); *B65D 21/086* (2013.01); *B65D 75/002* (2013.01); *B65D 77/02* (2013.01); *B65D 81/34* (2013.01); *B65D 85/816* (2013.01); *A23V 2002/00* (2013.01); *B65B 7/28* (2013.01); *B65B 53/02* (2013.01); *B65B 2220/14* (2013.01); *B65B 2220/16* (2013.01); *B65B 2230/02* (2013.01); *B65D 2581/3404* (2013.01)

(58) Field of Classification Search
CPC ...... B65D 75/002; B65D 77/02; B65D 81/34; B65D 85/816; B65D 2581/3404; B65B 1/02; B65B 25/001; B65B 7/28; B65B 2220/14; B65B 2220/16; B65B 2230/02; A23L 27/00
See application file for complete search history.

(56) References Cited

FOREIGN PATENT DOCUMENTS

| CN | 103407703 A | | 11/2013 |
|---|---|---|---|
| CN | 104016019 A | | 9/2014 |
| JP | 52-159365 | * | 5/1977 |
| JP | 05-9325 | * | 2/1993 |
| JP | 2003-292029 | * | 10/2003 |

OTHER PUBLICATIONS

JP 05-9325 Translation Feb. 1993 Yanagiya.*
JP 52-159365 Translation May 1977 Nemoto.*
JP 2003-292029 Translation Oct. 2003 Mitsui.*

* cited by examiner

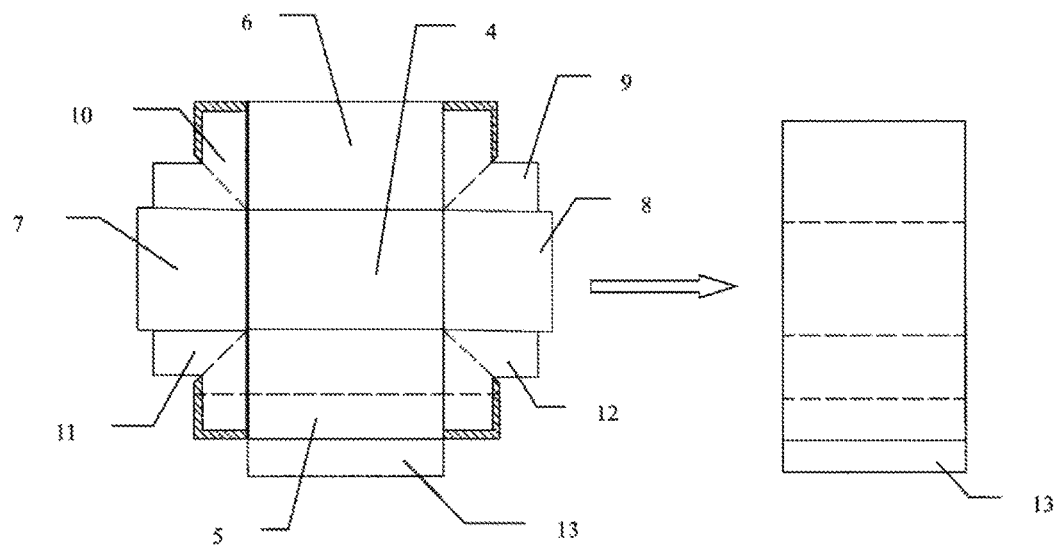
FIG. 4A
FIG. 4B
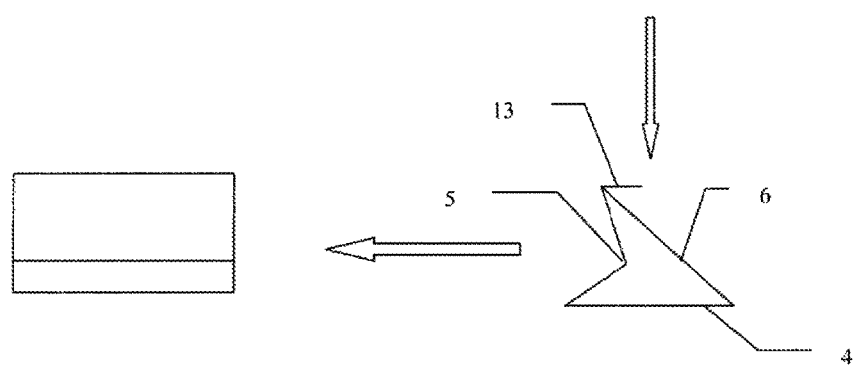
FIG. 4D
FIG. 4C

COMPRESSED-TYPE INSTANCE NOODLE PACKAGING BOX AND METHOD OF MANUFACTURING THE SAME

BACKGROUND OF THE INVENTION

Field of the Invention

The present invention relates to a container for instant foods, and particularly to a compressed-type container for holding instant noodle and a method of manufacturing the same.

Description of the Related Art

With the development of society and productivity, instant foods are loved by a wide spectrum of people because of its convenience. Especially, many people prefer instant noodles as a favorite food because of being ready to eat by using hot water.

A conventional containers for instant noodle are mostly formed in a bowl or a tub for holding an instant noodle block unpackaged, and soup base, sauce and cutlery packaged separately.

Further, the material of the container has a thickness capable of supporting their shape and a double shell structure for heat-insulating. The inside of the container is waterproof coated, and very thin PP films are used as the outer packing material of the container.

Accordingly, the conventional instant noodle containers have the following drawbacks:

The instant noodles can be contaminated with various harmful substances such as pathogenic bacteria and parasites because the unsealed instant noodle block is packaged together with the packaged sauces in one container. Also, because most space of the container is empty (about ⅔), it leads to increase transportation and logistics costs, and thereby causes higher consumer price.

Further, a conventional container for instant noodles has a bowl or a tub shape to keep its shape. Due to this, the volume of the container is increased so that it is unhandy to carry, and the shipments of the container is increased so that the carbon dioxide production is increased. Accordingly, it is necessary to reduce the volume of the container for instant noodles.

Meanwhile, a conventional container for instant noodles is double-packaged for heat insulation. Due to this, it is difficult to reduce the volume of the container.

Further, a conventional container for instant noodles has a cone shape such as a bowl or a tub. Due to this, the productivity of the container is decreased.

That is, due to the volume difference between the food and the packaging in a conventional container for instant noodles, it is inconvenient to transport, storage and carry the products. Finally, this can add unnecessary costs.

SUMMARY OF THE INVENTION

In order to solve the above problems of the prior art, the present invention provides a compressed-type instant noodle packaging box and a method of manufacturing the same.

A compressed-type instant noodle packaging box according to the present invention comprises a packaging box main body of a cuboidal shape whose volume is slightly larger than that of an instant noodle block; a box cover for covering the packaging box main body; and a foldable container whose bottom surface is attached to the bottom surface of the packaging box main body. The foldable container is developed to a cuboidal body higher than the packaging box main body. An instant noodle block, a seasoning sauce and cutlery packaged separately, are placed on the upper surface of the foldable container in the inside of the packaging box main body. When the box cover covers the packaging box main body, the outer circumference surface of the packaging box main body is sealed with a layer of heat-shrinkable film.

It is desirable that the box cover have an arc-shaped cutout opening for more easily detaching.

It is desirable that the box cover and the packaging box main body are installed in a body.

A method of manufacturing a compressed-type instant noodle packaging box according to the present invention comprises the steps of:

(Step 1) manufacturing a packaging box main body and a box cover to fit the volume of an instant noodle block;

(Step 2) manufacturing a foldable container and attaching the bottom surface of the foldable container to the inner bottom surface of the packaging box main body;

(Step 3) placing an instant noodle block, a seasoning sauce and cutlery packaged separately, on the upper surface of the foldable container in the inside of the packaging box main body; and (Step 4) covering the packaging box main body with the box cover and sealing the whole of the packaging box with a heat-shrinkable film.

A method of manufacturing the foldable container according to the present invention is as follows:

When the foldable container is spread to flatten out the entire surface, the foldable container comprises a rectangular bottom surface, a front side wall and a rear side wall connected to two long sides of the bottom surface of the packaging box main body, and a left side wall and a right side wall connected to two short sides of the bottom surface of the packaging box main body. The foldable container further comprises a first support wing for connecting the rear side wall and the right side wall; a second support wing for connecting the rear side wall and the left side wall; a third support wing for connecting the front side wall and the left side wall; and a fourth support wing for connecting the front side wall and the right side wall, at four corners of the bottom surface, respectively. The front side wall and the rear side wall have a height equal to or smaller than the width of the bottom surface of the packaging box main body.

When the foldable container is developed to the cuboidal body, the four supporting wings support the cuboidal body strongly and assure the sealing of the container to prevent leakage.

The folding process of the foldable container comprises the steps of: with using the two short sides of the bottom surface as folding lines, folding the left side wall, the second support wing and the third support wing, and the right side wall, the first support wing and the fourth support wing inward to be contacted with the plane on the bottom surface of the packaging box main body; with using the two long sides of the bottom surface of the packaging box main body as folding lines, folding the lower part of the front side wall and the rear side wall inward; with using the middle line of the front side wall as a folding line, folding the upper part of the front side wall outward; pressing the transverse support wing against the upper surface of the rear side wall to attach to the bottom surface of the packaging box main body; and forming a foldable container corresponding to the size of the bottom surface of the packaging boxy main body.

The present invention has the effects as follows:

The present invention use a packaging box main body whose volume is slightly larger than that of an instant noodle block, and which has a small volume and occupies little space. Due to this, it is convenient for transporting and carrying. Further, the instant noodle block is separately packaged to be not contacted with the seasoning sauce in the packaging box. Due to this, the growth of bacteria can be suppressed.

Further, because the foldable container is attached to the packaging box main body, when being developed, the four sides of the foldable container are contacted and combined with the four sides of the packaging box main body. Due to this, after developing, the four sides of the packaging box main body also support additionally against the cuboidal body, so that the cuboidal body can be formed more safely. Therefore, the present invention is convenient and simple to use.

Further, because the packaging box main body functions as a heat insulation material, it can be held more easily.

Further, the method for folding and developing a foldable container according to the present invention is convenient and simple to manipulate.

BRIEF DESCRIPTION OF THE DRAWINGS

FIGS. 4A to 4D are explanatory views showing how to fold a foldable container according to the present invention.

DETAILED DESCRIPTION OF THE INVENTION

Referring now to attaching the drawings, an embodiment of the present invention will be described in detail.

Figure 1:
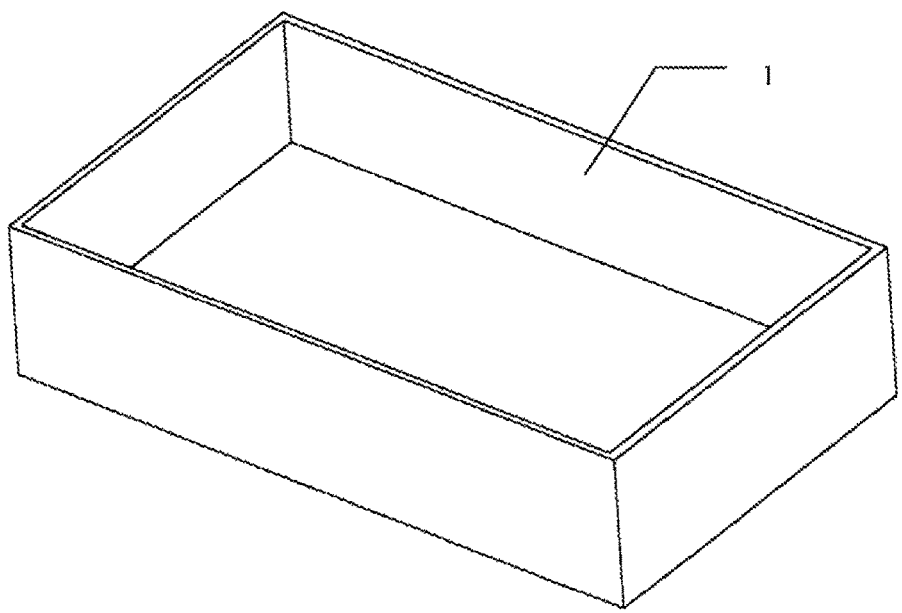
FIG. 1 is an explanatory view showing the structure of a packaging box main body according to the present invention.
Figure 2:
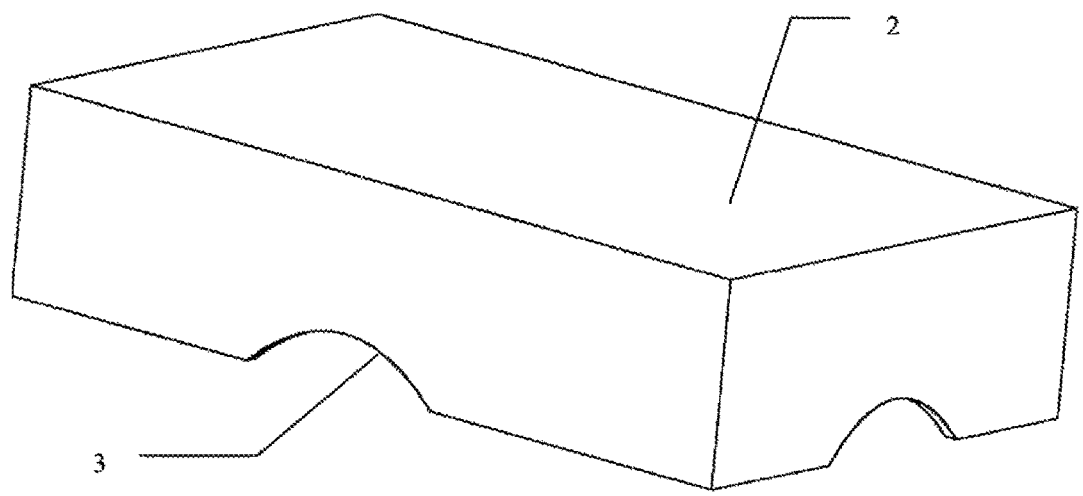
FIG. 2 is an explanatory view showing the structure of a box cover according to the present invention.
Figure 3:
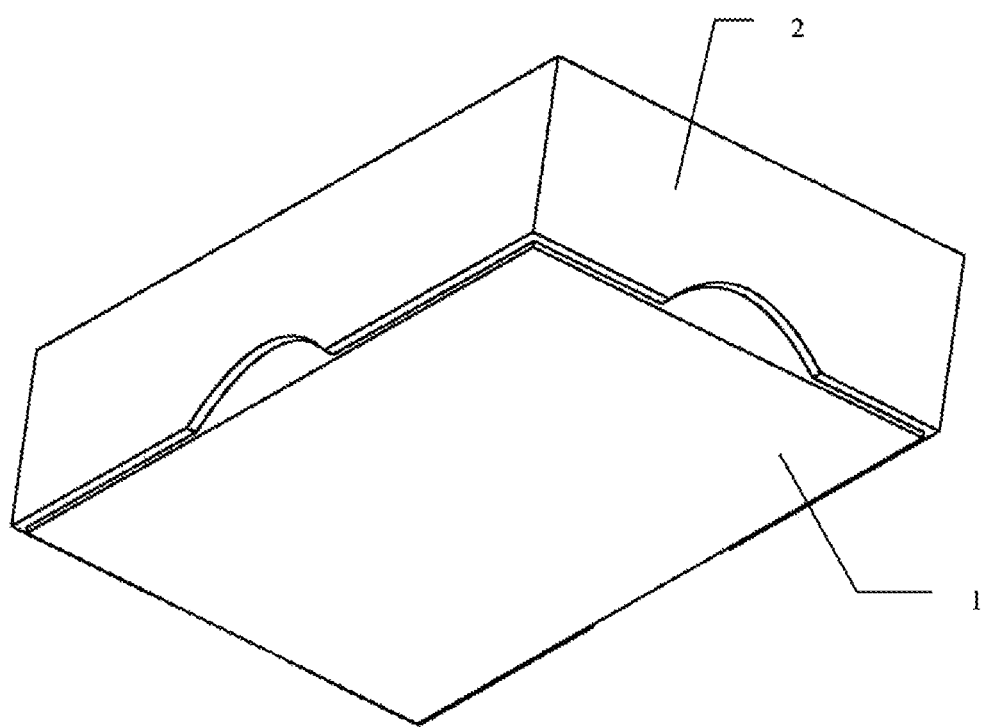
FIG. 3 is an explanatory view showing the whole structure of a packaging box after covering a packaging box main body with a box cover.
Figure 6:
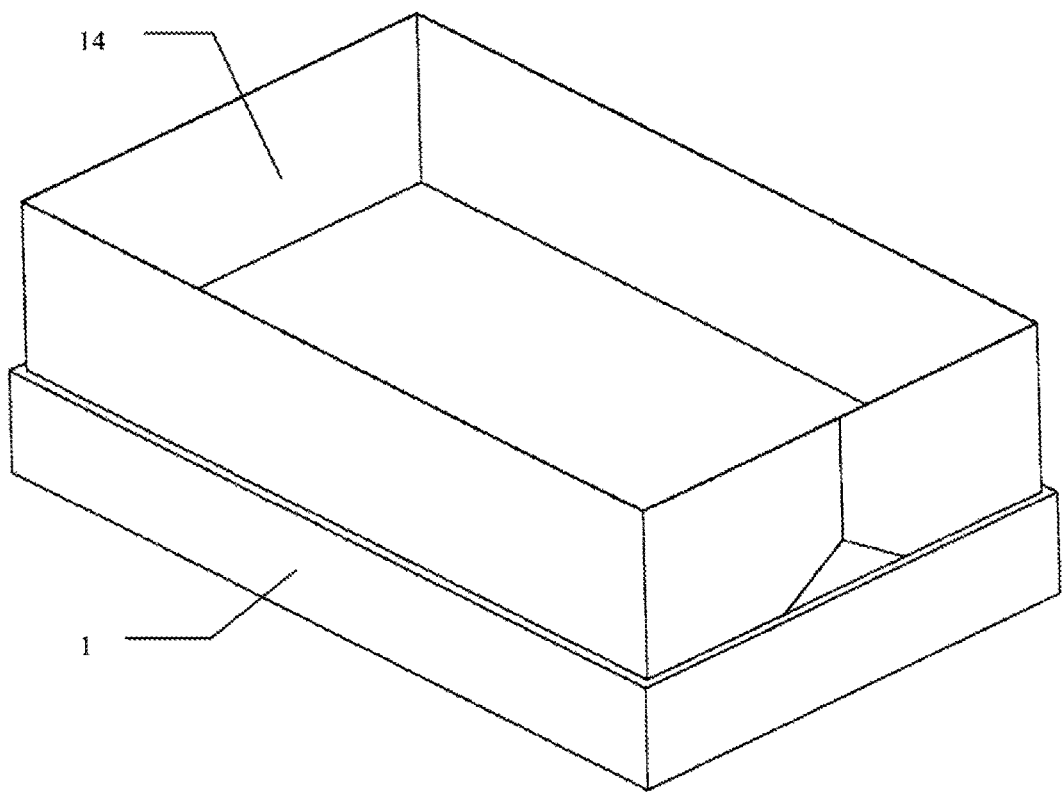
FIG. 6 is an explanatory view showing the structure of a foldable container after being developed in the inside of a packaging box main body.

The compressed-type instant noodle packaging box according to an embodiment of the present invention comprises a packaging box main body 1 of a cuboidal shape whose volume is slightly larger than that of an instant noodle block and a box cover 2 for covering the packaging box main body 1, as shown FIGS. 1 and 2. The compressed-type instant noodle packaging box also comprises a foldable container whose bottom surface 4 is attached to the bottom surface of the packaging box main body 1, as shown FIG. 4D. The foldable container is developed to a cuboidal body 14 higher than the packaging box main body 1, as shown FIG. 6. An instant noodle block, a seasoning sauce and cutlery packaged separately, are placed on the upper surface of the foldable container in the inside of the packaging box main body 1. As shown FIG. 3, when the box cover 2 covers the packaging box main body 2, the outer circumference surface of the packaging box main body 2 is sealed with a layer of heat-shrinkable film.

As shown FIG. 2, it is desirable that the box cover 2 have an arc-shaped cutout opening 3 for more easily detaching.

A method of manufacturing a compressed-type instant noodle packaging box comprises the steps as follows:

Step 1: The packaging box main body 1 and the box cover 2 are manufactured to fit the volume of the instant noodle block;

Step 2: The foldable container is manufactured and the bottom surface 4 of the foldable container is attached to the inner bottom surface of the packaging box main body 1;

Step 3: An instant noodle block, a seasoning sauce and cutlery packaged separately, are placed on the upper surface of the foldable container in the inside of the packaging box main body 1; and Step 4: the packaging box main body 2 is coved with the box cover 2 and the whole of the packaging box is sealed with a heat-shrinkable film.

Next, a method of manufacturing the foldable container is described below.

As shown in FIG. 4A, the foldable container can be spread to flatten out the entire surface. The spread foldable container comprises a rectangular bottom surface 4, a front side wall 5 and a rear side wall 6 connected to two long sides of the bottom surface 4, and a left side wall 7 and a right side wall 8 connected to two short sides of the bottom surface 4. The spread foldable container also comprises a first support wing 9 for connecting the rear side wall 6 and the right side wall 8; a second support wing 10 for connecting the rear side wall 6 and the left side wall 7; a third support wing 11 for connecting the front side wall 5 and the left side wall 7; and a fourth support wing 12 for connecting the front side wall 5 and the right side wall 8, at four corners of the bottom surface 4, respectively. The front side wall 5 and the rear side wall 6 have a height equal to or smaller than the width of the bottom surface 4. When the foldable container is developed to the cuboidal body 14, the four supporting wings support the cuboidal body 14 and assure the sealing of the container to prevent leakage. In FIG. 4A, the shading shows portions for being attached.

Preferably, when being spread to flatten out the entire surface, the foldable container further comprises a transverse support wing 13 connected with the front side wall 5.

The folding process of the foldable container is as follows:

Firstly, with using the two short sides of the bottom surface 4 as folding lines, fold the left side wall 7, the second support wing 10 and the third support wing 11, and the right side wall 8, the first support wing 9 and the fourth support wing 12 inward, respectively, so that they are contacted with the plane on the bottom surface 4, as shown FIG. 4D.

Secondly, fold the lower part of the front side wall 5 and the rear side wall 6 inward with using the two long sides of the bottom surface 4 as folding lines, and at the same time, fold the upper part of the front side wall 5 outward with using the middle line of the front side wall 5 as a folding line.

Thirdly, as shown FIG. 4C for explaining how to fold the container as viewed from the right side direction, press the transverse support wing 13 against the upper surface of the rear side wall 6 to attach to the bottom surface 4.

Finally, as shown FIG. 4D, form a foldable container corresponding to the size of the bottom surface 4.

Figure 5A:
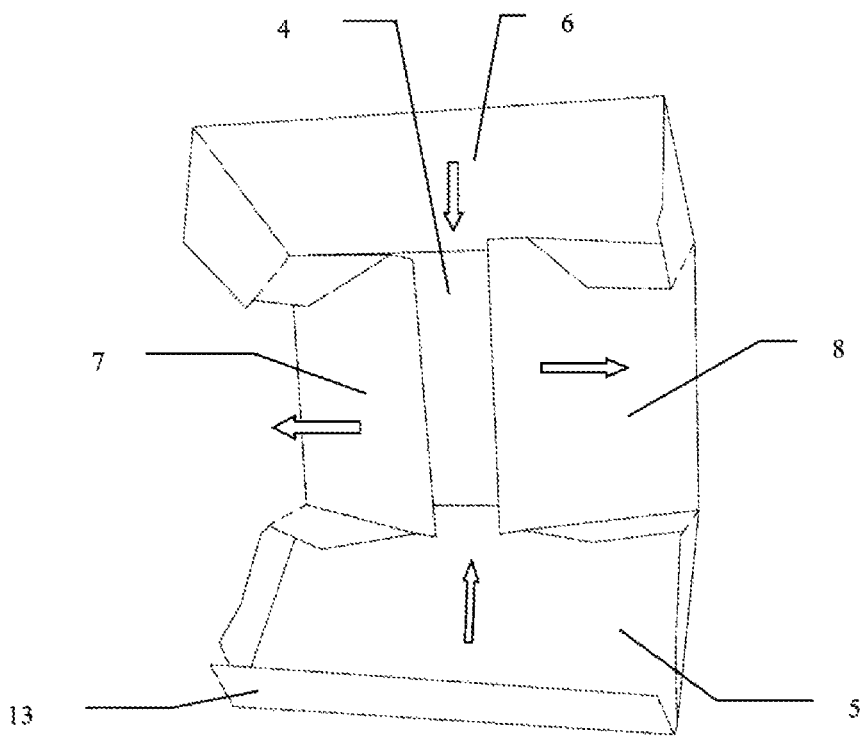
FIGS. 5A and 5B are explanatory views showing how to develop a foldable container according to the present invention.
Figure 5B:
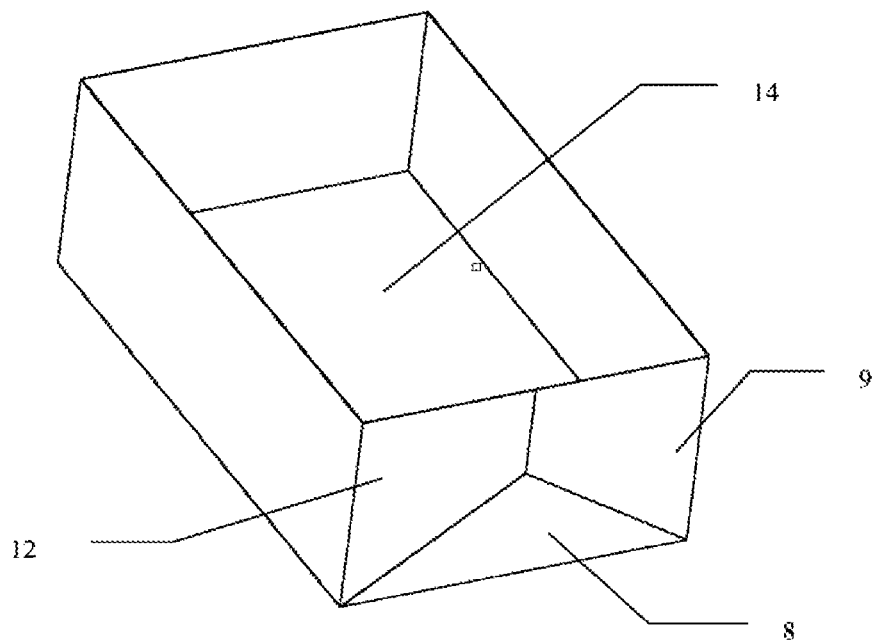

The developing process of the foldable container is opposite to the folding process and shows in FIGS. 5A and 5B.

Firstly, develop the front side wall 5 and the rear side wall 6, and then the left side wall 7 and the right side wall 8. At this point, fold the four side support wings outward and in the corresponding left and right side wall directions, along the corresponding broken lines.

Secondly, after folding, attach each support wing to the corresponding left and right side walls by using the attaching area, as shown FIG. 5A.

Finally, form the cuboidal body 14 as shown FIG. 5B.

The use process of the present invention is as follows:

Firstly, remove the heat shrinkable film, open the box cover, and then take out the instant noodle block, the seasoning sauce and the cutlery which are separately packaged. Then, develop the foldable container. Actually, the foldable container is developed in the inside of the packaging box main body 1 as described above. The development of the inside of the packaging box main body 1 shows in FIG. 6.

After developing, take out the instant noodle block and put it in the cuboidal body 14. And then put the seasoning sauce and the hot water in the cuboidal body 14. After a few minutes of waiting, it is now possible to eat.

Because the foldable container and the packaging box main body are attached to each other, after they are developed to the cuboidal body, the four sides of the foldable container are contacted and combined with the four sides of the packaging box main body. Therefore, the four sides of the packaging box main body also support additionally against the cuboidal body after developing, so that the cuboidal body can be formed more safely. Further, because the packaging box main body functions as a heat insulation material, it can be held more easily.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A compressed-type instant noodle packaging box comprising:
    a packaging box main body having a cuboidal shape of which a top side is open;
    a box cover for covering the packaging box main body, the box cover being separated from the packaging box main body and having a cuboidal shape of which a bottom side is open; and
    a foldable container disposed inside the packaging box main body in such a manner that a bottom side wall of the foldable container is attached to a bottom side of the packaging box main body,
    wherein when the foldable container is folded to a cuboidal shape, a cuboidal body of the foldable container has a height greater than a height of the packaging box main body,
    wherein an instant noodle block, a seasoning sauce and cutlery packaged separately, are placed on the foldable container,
    wherein when the box cover covers the packaging box main body, an outer circumference surface of the packaging box main body is sealed with a layer of heat-shrinkable film, and
    wherein when the foldable container is unfolded in a flat shape, the foldable container comprises:
        the bottom side wall having a rectangular shape with a front side, a rear side, a left side and a right side;
        a front side wall having a rectangular shape, a first side of the front side wall being foldably connected to the front side of the bottom side wall;
        a rear side wall having a rectangular shape, a first side of the rear side wall being foldably connected to the rear side of the bottom side wall;
        a left side wall having a rectangular shape, a first side of the left side wall being foldably connected to the left side of the bottom side wall;
        a right side wall having a rectangular shape, a first side of the right side wall being foldably connected to the right side of the bottom side wall;
        a first support wing foldably connected between the rear side wall and the right side wall;
        a second support wing foldably connected between the rear side wall and the left side wall;
        a third support wing foldably connected between the front side wall and the left side wall;
        a fourth support wing foldably connected between the front side wall and the right side wall; and
        a transverse support wing having a rectangular shape and connected only to the front side wall such that one side of the transverse support wing is foldably connected to a second side of the front side wall, the second side of the front side wall being opposite to the first side of the bottom side wall.

2. The compressed-type instant noodle packaging box of claim 1, wherein the box cover has an arc-shaped cutout opening.

3. A method of manufacturing a compressed-type instant noodle packaging box comprising the steps of:
    manufacturing a packaging box main body and a box cover to fit a volume of an instant noodle block;
    manufacturing a foldable container and attaching a bottom side wall of the foldable container to a bottom side of the packaging box main body;
    placing the instant noodle block, a seasoning sauce and cutlery packaged separately, on the foldable container disposed in the packaging box main body; and
    covering the packaging box main body with the box cover and sealing with a heat-shrinkable film,
    wherein when the foldable container is unfolded in a flat shape, the foldable container comprises:
        the bottom side wall having a rectangular shape with a front side, a rear side, a left side and a right side;
        a front side wall having a rectangular shape, a first side of the front side wall being foldably connected to the front side of the bottom side wall;
        a rear side wall having a rectangular shape, a first side of the rear side wall being foldably connected to the rear side of the bottom side wall;
        a left side wall having a rectangular shape, a first side of the left side wall being foldably connected to the left side of the bottom side wall;
        a right side wall having a rectangular shape, a first side of the right side wall being foldably connected to the right side of the bottom side wall;
        a first support wing foldably connected between the rear side wall and the right side wall;
        a second support wing foldably connected between the rear side wall and the left side wall;
        a third support wing foldably connected between the front side wall and the left side wall;
        a fourth support wing foldably connected between the front side wall and the right side wall; and
        a transverse support wing having a rectangular shape and connected only to the front side wall such that one side of the transverse support wing is foldably connected to a second side of the front side wall, the second side of the front side wall being opposite to the first side of the bottom side wall.

4. The method of manufacturing a compressed-type instant noodle packaging box of claim 3, wherein a folding process of the foldable container comprises the steps of:
folding the left side wall, the second support wing and the third support wing inward to be contacted with the bottom side wall;
folding the right side wall, the first support wing and the fourth support wing inward to be contacted with the bottom side wall
folding a lower part of the front side wall inward with using a middle line of the front side wall as a folding line, and folding the rear side wall at the same time;
folding an upper part of the front side wall outward;
pressing the transverse support wing against the upper surface of the rear side wall to attach to the bottom side wall; and
forming the foldable container corresponding to a size of the bottom side wall.

\* \* \* \* \*